Dec. 21, 1926.
S. B. REDFIELD
SEALING DEVICE
Filed July 15, 1926
1,611,678
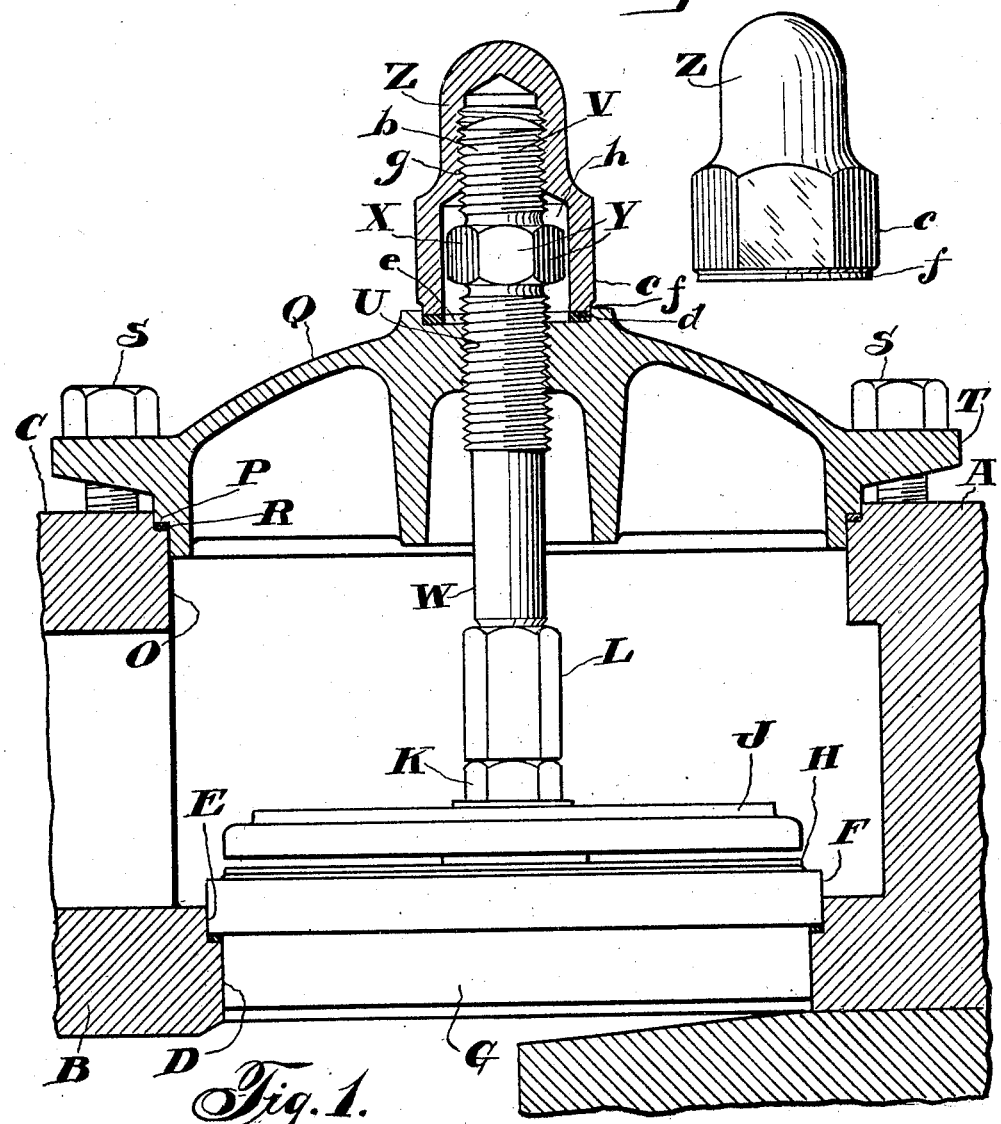

Patented Dec. 21, 1926.

1,611,678

UNITED STATES PATENT OFFICE.

SNOWDEN B. REDFIELD, OF EASTON, PENNSYLVANIA, ASSIGNOR TO INGERSOLL-RAND COMPANY, OF JERSEY CITY, NEW JERSEY, A CORPORATION OF NEW JERSEY.

SEALING DEVICE.

Application filed July 15, 1926. Serial No. 122,716.

This invention relates to compressors and the like, but more particularly to a sealing device for the inlet and exhaust valves of compressors, especially those handling noxious gases.

In compressors in which inlet and exhaust valves of the plate type are used for controlling the admission and exhaust of fluid into and from the cylinder, some difficulty is at times experienced in maintaining fluid tight joints between the parts which comprise the valve securing means. Such means usually consist of a suitable cover for the opening in the outer wall through which the valve is inserted into the head, and a set screw is then screwed into the cover to bear against the valve for clamping the valve to its seat.

Owing to the clearance which usually exists between the screw and the tap hole some of the fluid being compressed escapes therethrough to the atmosphere. A well known method intended to prevent such leakage consists in placing an ordinary cap nut over the outer end of the set screw. The undesirable feature of this construction is that the head of the screw must of necessity be of smaller cross sectional area than the body of the screw. As a result, only small flats may be formed on the head, thus providing only a small hold for a wrench and in consequence the corners of the head quickly become worn and rounded.

The present invention is intended to overcome these limitations and a few of its objects are to prevent leakage of fluid along the threads of the set screw and associated parts and to permit the formation of a large head on the set screw.

Other objects will be in part obvious and in part pointed out hereinafter.

The invention consists of the combination of elements and features of construction substantially as hereinafter described and more particularly pointed out in the appended claims and illustrated in the accompanying drawings, in which—

Figure 1 is a sectional elevation of a portion of a compressor head showing a set screw and the cap nut constructed in accordance with the practice of the invention, and Figure 2 is an outside view in elevation of the cap nut.

Referring to the drawings in which is illustrated a practical application of the invention, A designates a portion of a compressor head or cylinder having an inner wall B and an outer wall C. A valve seat opening D is formed in the inner wall B and at its outer end is provided with a counterbored portion E to receive a flange F of a plate valve seat G which in this instance extends into the valve seat opening D. A valve plate H is seated on the valve seat G and a stop plate J spaced a slight distance from the plate valve H serves to limit the lift of the valve plate.

The parts comprising the valve assembly are intended to be clamped together in the usual manner, that is, by a stud bolt (not shown) on which is screwed a nut K to seat on the valve stop J and the nut K is locked against accidental removal by a jam nut L.

In the outer wall C is formed an opening O preferably coaxial with the valve seat opening D and of sufficiently larger diameter than said valve seat opening to permit the plate valve assembly to be readily inserted therethrough. The outer end of the opening O is counterbored to form a shoulder P upon which is seated a cover plate Q. A gasket R may be interposed between the cover plate Q and the shoulder P to form a fluid tight joint therebetween.

Any suitable means may be provided for clamping the cover plate tightly on the head A. In this instance, tap bolts S are screwed into the wall C and bear with their heads on a flange T of the cover plate Q.

In accordance with the present invention, a threaded aperture U is formed in the cover plate Q preferably coaxial with the valve assembly to receive a set screw V having a plain forward extension W adapted to seat on the jam nut L. Intermediate the threaded portion of the screw V is formed a head X of considerably larger cross sectional area than the screw V thus forming large flats Y for the reception of a wrench whereby the screw V may be manipulated.

In order to prevent the escape of any fluid which may leak through the threaded aperture U to the atmosphere, a cap nut Z is screwed on the outer end $b$ of the screw V and has a skirt $c$, the front end of which may be clamped firmly against the cover plate Q or, if desired, a gasket $d$ may be interposed between the cover plate and the front end of the skirt $c$. In this instance the cover plate Q is provided with a recess *e* for the reception of the gasket *d* and also to cooperate with a cylindrical portion *f* formed on the front end of the cap nut Z for the purpose of centralizing said cap nut and locating the gasket. Formed forwardly of the threaded portion *g* of the cap nut Z is a recess *h*. This recess is preferably of sufficient depth and cross sectional area to permit the entrance of the head X thereinto without contacting with the cap nut.

By means of the construction hereinbefore described a perfect seal may be maintained between the cap nut and the cover plate Q. In this way any fluid which may leak through the threaded aperture U will be prevented from finding its way to the atmosphere. This is especially desirable in compressing fluids such as ammonia and other gases, which, when inhaled frequently cause great discomfort to the attendant or injury to the health.

Another desirable feature of this invention is that this construction permits of a large head being formed on the set screw, thus providing a large area of contact for a wrench and also preventing the objectionable rounding of the corners of the head X which has heretofore rendered such screws difficult of manipulation.

I claim:

1. In a compressor or the like, the combination of a cover having a threaded aperture, a screw to cooperate with the aperture, a head intermediate the ends of the screw, said head being of greater cross sectional area than the screw to obtain increased contact surface for manipulation, and a cap nut on the screw, said cap nut having a recess of larger diameter than the head to receive said head.

2. In a compressor or the like, the combination of a cover having a threaded aperture, a screw to cooperate with the aperture, a head intermediate the ends of the screw, said head being of greater cross sectional area than the screw, a cap nut on the end of the screw, a skirt on the cap nut to encircle the head, and a gasket between the skirt and the cover to prevent the escape of fluid leaking through the threaded aperture.

In testimony whereof I have signed this specification.

SNOWDEN B. REDFIELD.